United States Patent [19]

Dean

[11] 3,871,098
[45] Mar. 18, 1975

[54] BRACKET PLACER
[76] Inventor: J. Thomas Dean, 205 Haverhill Cir., Easley, S.C. 29640
[22] Filed: Sept. 27, 1973
[21] Appl. No.: 401,276

Related U.S. Application Data
[63] Continuation-in-part of Ser. No. 277,554, Aug. 3, 1972, abandoned.

[52] U.S. Cl. ................................................. 32/66
[51] Int. Cl. ............................................ A61c 7/00
[58] Field of Search .......... 32/66, 40 R, 14 A, 14 B, 32/14 C, 14 D

[56] References Cited
UNITED STATES PATENTS
2,883,749  4/1959  Brunson ................................ 32/66
3,686,762  8/1972  Sutter .................................... 32/66

*Primary Examiner*—Robert Peshock
*Attorney, Agent, or Firm*—Kenyon & Kenyon Reilly Carr & Chapin

[57] ABSTRACT

The invention described is for an instrument to place small objects a known distance and at a known angle from a given point and then releasing the object. It is particularly adapted for use in applying orthodontic brackets directly to teeth by means of a bonding compound. The instrument comprises a holder for the object, a release mechanism to release the object after placement and a positioning arm for precisely placing the object a measured distance from a given point. The instrument is housed in a small body adaptable to be easily held in the hand.

7 Claims, 7 Drawing Figures

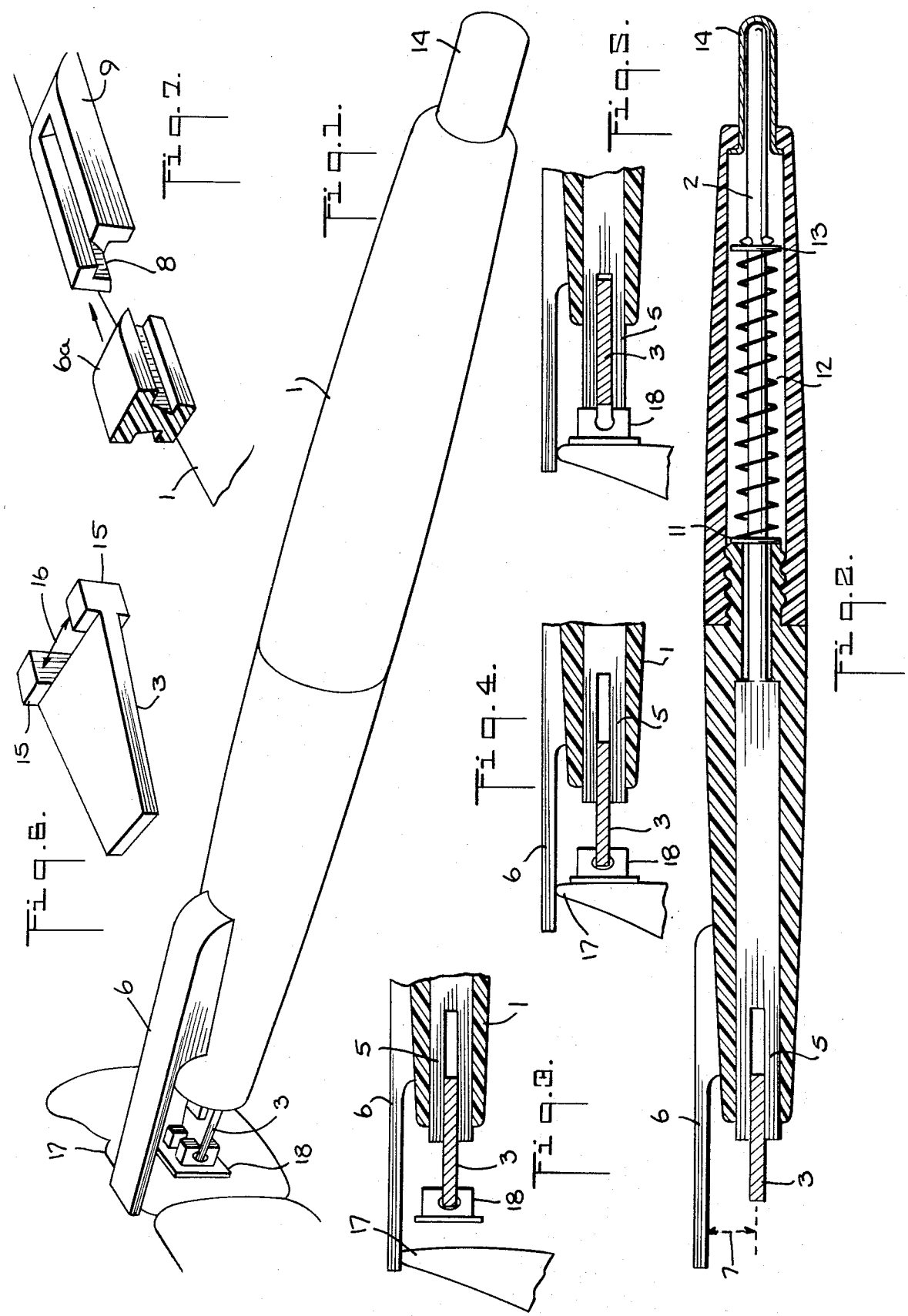

BRACKET PLACER

This is a continuation-in-part of my earlier filed application Ser. No. 277,554 filed Aug. 3, 1972 and now abandoned.

DESCRIPTION OF PRIOR ART

Until quite recently, the orthodontic technique standardly used has been to encase each tooth in a metal band, and then to attach a wire holder or bracket directly to the band by welding. Orthodontic arch wire was then placed through the wire slots of the various brackets and then drawn tight to obtain the necessary orthodontic effect.

New techniques have recently been developed, however, whereby the bracket is affixed directly to the tooth by means of adhesives or cement. The positioning of the bracket in relationship to the tooth and holding the bracket securely, without the slightest movement, on the tooth until the adhesive has had time to set, has become very important. This new technique also gives rise to a new problem in that the cement has a tendency to fill the wire slot of the bracket, thus making insertion of the wire thereafter very difficult. Further, a perenial problem in orthodontic procedures has been cleanliness. This problem is intensified in the new technique where manual placement is used.

For proper and exact orthodontic procedures it is necessary to set the bracket an exact distance from the incisal edge of the tooth and, in many cases, to cant the bracket several degrees out of parallel to allow placement of the bracket at a specific angle to the incisal edge. This is practically impossible manually and to measure each such distance and to obtain each such angle is cumbersome with standard existing tools.

SUMMARY OF THE INVENTION

This invention is for a light, easy to use, easy to manufacture, and precise instrument for placing objects a specific distance and at a certain angle from a given point. It is particularly adapted for placing orthodontic brackets directly to teeth with an adhesive.

There is a body shaped to be easily held in the hand into which a blade is affixed. This blade is of such a thickness that it will fit snugly into the wire slot in an orthodontic plastic bracket. Mounted on the outside of the body at a fixed distance from the holding blade is a distance and angulation measuring arm. This arm may be rigidly mounted on the body; mounted so that it can be removed and replaced by an interchangeable arm to give a different distance and angle from the bracket holding blade; or be provided with various covers to slip over it to vary the distance and angle. A spring loaded ejector, operating through the body, is provided so that the bracket may be wiped from the bracket holding blade when the bracket is set on the tooth.

In use, the correct height and angle arm or cover is selected and positioned on the placer. The bracket holding blade is then inserted into the wire slot of the bracket to be placed on the tooth. Cement or adhesive is applied to the rear of the bracket. The inner edge of the arm is placed against the incisal edge of the tooth, centering the bracket mesio-distally by eye, and the bracket is then pushed against the labial or buccal surface of the tooth. It is held there until the adhesive is set, at which time the ejector is actuated, removing the blade from the bracket and leaving the bracket on the tooth.

It is an object of this invention to provide a tool which will place small objects at a known distance and at a known angle from a given point.

It is another object of this invention to provide a tool which is simple and inexpensive to manufacture, yet which is strong and durable.

It is yet another object of this invention to provide a tool which will facilitate placing orthodontic brackets directly to teeth accurately and with a strong bond.

Another object of this invention is to provide a sanitary tool for use by orthodontists in placing brackets directly to teeth.

It is a still further object of this invention to provide a tool for placing orthodontic brackets directly to teeth and which is adapted to prevent adhesive from entering the wire slots of the brackets.

BRIEF DESCRIPTION OF THE DRAWINGS

FIG. 1 is an isometric view of the placer of the present invention.

FIG. 2 is a longitudinal cross-section of the placer of FIG. 1.

FIGS. 3, 4 and 5 are partial, longitudinal, cross-sectional views of the placer of FIG. 1 showing the blade, ejector and arm of the present invention in various stages of the operation.

FIG. 6 is an isometric view of the blade of the present invention.

FIG. 7 is an isometric view of an alternate embodiment of affixing the arm to the body of the present invention.

DESCRIPTION OF THE PREFERRERD EMBODIMENT

As best shown in FIGS. 1 and 2, this invention is housed in a body 1 which may be of any convenient material such as plastic, metal, etc. The interior of the body 1 is hollow and the release means or ejector 2 extends the axial length of the body.

At the front of the body is a holder or blade 3. This blade is of a thickness so that it will fit snugly into the wire slot of a plastic or metal bracket. This thickness would be either 0.018 or 0.022 inches for those brackets presently on the market. The blade 3 is securely held with respect to the body 1, although the blade is designed so that it may be removed from the body 1 and replaced by a blade of different thickness to accommodate different types of brackets. In the alternative, the blade 3 does not have to be detachable, but can be permanently affixed to the body 1 when the interchangeability feature is unnecessary. There would be, therefore, one 0.018 inch blade and another 0.022 inch blade. Other appropriate sizes could be provided if desired. In any event, blade 3 is fixedly held to the body 1 while the base 5 is slidable with respect to both the blade 3 and body 1 as illustrated in FIGS. 4 and 5.

A guide or distance and angular arm 6 is attached to the outer part of body 1. This arm is positioned a given and known distance 7 (FIG. 2) from the longitudinal center line of blade 3 so that when the inner surface of the arm 6 is placed against the incisal edge of a tooth 17 the center of the bracket 18 will be at an exact distance from that edge. This distance would normally be 3.5, 4.0 or 5.0 millimeters. As shown in FIG. 2 this arm 6 may be parallel to the blade 3, or for certain orthodontic techniques, it could be canted at a known angle. These angles are generally 2, 4 or 6 degrees, but could be others as well. The arm 6 may be rigidly attached to the body 1, so that to obtain the varying distances shown at 7 in FIG. 2, a set of the placers would be required. Alternatively, the arm 6 could be detachably secured to the body 1 so that only a series of arms would be required to vary the distance 7 or the angle between the center line of the blade 3 and the inside edge of the arm 6. As shown in FIG. 7, this arrangement might be provided by a dove tailed slot 8 in a member 9 affixed to the top of the body 1. The rear edge 6a of the arm 6 would then be shaped in a fashion to engage the slot 8. Other means and configurations could also be used to detachably, but securely, mount the arm 6 on the body 1.

Also various covers (not shown) could be used to slip over a fixed arm to vary the distance and angle.

The ejector 2 extends the length of the body 1 and the base 5 of ejector 2 extends in a sliding relationship on the top and bottom of blade 3, as shown in FIGS. 2, 3 and 4. The ejector 2 fits between the tips 15 of blade 3 in the space shown generally as 16 in FIG. 6. Within the body 1 there is provided a spring stop washer 11 and mounted on the ejector 2 is a spring 12, coiled thereupon and resting on the spring stop washer 11. Integral with the ejector 2 is a spring stop 13. Mounted on the rear of the ejector 2 is a cap, shown generally at 14, which may be of any convenient construction. Thus when the cap 14 is moved into the body 1 by finger pressure, the base 5 of the ejector 2 passes over the top and bottom surfaces of blade 3, which is fixed onto the body 1, thereby freeing the blade 3 from the wire slot of the bracket 18, as shown in FIG. 5. In other words, with the blade 3 fixed with respect to the body 1, forward movement of base 5 against bracket 18 causes the blade 3 and body 1 to be pushed away from and out of engagement with the bracket 18 as shown in FIG. 5. When the pressure is released from the cap 14, the spring 12 will push against the spring stop washer 11 and spring stop 13, causing the ejector 2 to move into its rest position.

In operation, depending upon the exact orthodontic technique being applied, the orthodontist would first select an appropriate placer for the desired distance and angulation of the bracket 18 from the incisal edge of the tooth 17, if a fixed-arm placer is used, or select an interchangeable arm 6 or cover which would give the desired distance and appropriate cant, if a placer with interchangeable parts is used. He would then insert a blade 3 into the placer which would be of the appropriate thickness, depending upon the wire slot measurements of the particular bracket 18 being used.

He would then insert the blade 3 into the slot of the bracket 18, which would be held on the placer because of the pressure fit, and he would coat the rear of the bracket 18 with the adhesive.

The inner edge of the arm 6 would then be placed against the incisal edge of the tooth 17, the bracket 18 would be centered mesiodistally, and the bracket would be pressed against the labial or buccal surface of the tooth 17. It would be held in that position firmly until the adhesive sets, at which time the ejector 2 would be actuated by force at the cap 14. This would cause the ejector 2 to slide over the blade 3 and release the blade from the bracket 18. The orthodontist would then be ready to apply the next bracket to another tooth, in the same manner.

It can be seen that with the placer of this invention much greater accuracy of initial placement can be achieved; movement of the bracket before the adhesive sets is prevented, thus giving greater final accuracy and final bond strength; there is a prevention of cement or adhesive from filling the wire slot in the bracket; and the clincian's hands are kept clean at all times. It is also extremely simple and inexpensive to manufacture and most conventional materials may be used for the component parts, e.g., plastics, metals, etc.

While I have described my invention in detail and given specific embodiments, it should be understood that many modifications could be made to my invention without departing from the general principles thereof. Also, it should be recognized that, while the placer was described particularly for holding and affixing brackets to teeth in orthodontic work, it could be used for many other precision procedures where it is necessary to pick up the item to be placed, to place the item a given distance and at a given angle from a particular point, and then release the item.

What is claimed is:

1. A positioning device for placing orthodontic brackets on the labial surface of a tooth which comprises:
   a. an elongated body portion;
   b. holding means adapted to engage the bracket being placed on the surface of the tooth, said holding means being disposed at the forward end of said elongated body and fixedly held with respect thereto;
   c. guide means mounted to said forward end of said elongated body and adapted to engage the incisal edge of the tooth, said guide means being disposed a predetermined distance from said holding means so that the bracket may be accurately positioned on the labial surface of the tooth by appropriate positioning of said guide means, and
   d. means slidably mounted with respect to said elongated body and adapted to move parallel to the longitudinal axis thereof, said slidable means being movable with respect to said holding means so as to allow the bracket being positioned to be moved forwardly into engagement with the surface of the tooth and away from said holding means.

2. A positioning device in accordance with claim 1 wherein said elongated body portion comprises a tubular open ended member having said slidable means disposed therein.

3. A positioning device in accordance with claim 2 wherein said slidable means has at the forward end thereof a grooved section for engagement with said holding means, and said holding means includes on at least a portion thereof a tongue adapted to slidably engage said grooved section of said slidable means.

4. A positioning device in accordance with claim 3 which further includes a spring member mounted on said slidable means and disposed within said tubular open ended elongated body so as to bias said slidable means toward the release position.

5. A positioning device in accordance with claim 4 wherein said guide means is adapted to be mounted at different angular orientations with respect to said holding means so as to allow the bracket to be positioned at various angles on the labial surface of a tooth.

6. A positioning device for placing orthodontic elements which comprises:
   a. an elongated body portion;
   b. holding means adapted to engage the element being placed, said holding means being disposed at the forward end of said elongated body and fixedly held with respect thereto;
   c. guide means mounted to said forward end of said elongated body and having a portion extending beyond said elongated body and holding means so as to act as a guide in positioning the orthodontic element; and
   d. means slidably mounted with respect to said elongated body and adapted to move parallel to the longitudinal axis thereof, said slidable means being movable with respect to said holding means so as to allow the element being positioned to be moved forwardly into the desired engagement and said holding means to be withdrawn from said element in a direction away from and perpendicular to the surface upon which the element is positioned by means of the movement of said slidably mounted means.

7. A positioning device for placing orthodontic brackets on the labial surface of a tooth which comprises:
   a. a tubular open ended elongated body portion;
   b. holding means adapted to engage the bracket being placed on the surface of the tooth, said holding means being disposed at the forward end of said elongated body and fixedly held with respect thereto;
   c. guide means mounted to said forward end of said elongated body and adapted to engage the incisal edge of the tooth, said guide means being disposed a predetermined distance from said holding means so that the bracket may be accurately positioned on the labial surface of the tooth by appropriate positioning of said guide means;
   d. means slidably mounted within said tubular opend ended body adapted to move along the longitudinal axis of elongated body, said slidable means being movable with respect to said holding means so as to allow the bracket being positioned to be moved forwardly into engagement with the surface of the tooth and said holding means to be withdrawn from said bracket in a direction perpendicular to the surface of the tooth by means of the movement of said slidably mounted means; and
   e. a spring member mounted on said slidable means within said tubular open ended elongated body so as to bias said slidable means toward the release position.

* * * * *